United States Patent
Factor et al.

(10) Patent No.: US 8,660,997 B2
(45) Date of Patent: Feb. 25, 2014

(54) FILE SYSTEM OBJECT-BASED DEDUPLICATION

(75) Inventors: Michael E. Factor, Haifa (IL); Joseph Samuel Glider, Palo Alto, CA (US); Danny Harnik, Tel Mond (IL); Elliot K. Kolodner, Haifa (IL); Dalit Naor, Tel Aviv (IL); Demyn Lee Plantenberg, Sunnyvale, CA (US); Tal Sivan, Yokneam (IL)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 13/216,272

(22) Filed: Aug. 24, 2011

(65) Prior Publication Data
US 2013/0054540 A1   Feb. 28, 2013

(51) Int. Cl.
*G06F 17/30*   (2006.01)
(52) U.S. Cl.
USPC ............................................................ 707/692
(58) Field of Classification Search
USPC ............................................................ 707/692
See application file for complete search history.

(56) References Cited

U.S. PATENT DOCUMENTS

| | | | |
|---|---|---|---|
| 7,747,584 B1 * | 6/2010 | Jernigan, IV | 707/692 |
| 2009/0265399 A1 * | 10/2009 | Cannon et al. | 707/205 |
| 2009/0327625 A1 | 12/2009 | Jaquette et al. | |
| 2010/0088296 A1 * | 4/2010 | Periyagaram et al. | 707/705 |
| 2010/0088349 A1 | 4/2010 | Parab | |
| 2010/0121825 A1 | 5/2010 | Bates et al. | |
| 2010/0198797 A1 | 8/2010 | Videman | |
| 2012/0166401 A1 * | 6/2012 | Li et al. | 707/692 |

* cited by examiner

*Primary Examiner* — Rehana Perveen
*Assistant Examiner* — Alexander Khong
(74) *Attorney, Agent, or Firm* — F. Jason Far-hadia, Esq.; Century IP Group

(57) ABSTRACT

Systems and methods for optimizing deduplication in a data storage system are provided. The method comprises associating a first name with first data blocks including first content stored in a data storage system, wherein the first name is associated with the first data blocks by way of a reference to a first meta file that points to a data file which points to the first data blocks; storing a first signature derived from the first content in an indexing data structure, wherein the first signature is used to associate the first name with the first data blocks and as means to verify whether a second content is a duplicate of the first content, based on value of a second signature derived from the second content.

20 Claims, 5 Drawing Sheets

FILE SYSTEM OBJECT-BASED DEDUPLICATION

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to deduplication in a data storage system.

BACKGROUND

In computing, deduplication refers to a technique in which redundant data is deleted from the storage space to improve storage utilization. In the deduplication process, the goal is to retain only a single copy of the data that is to be stored, as opposed to storing multiple copies of the same data. Accordingly, blocks of data that are stored on a storage medium are compared to detect the duplicate copies. Each block of data is assigned an identification or a signature that is typically calculated using cryptographic hash functions.

In general, if the signatures of one or more data blocks are identical, then it is assumed that the data blocks are duplicates (i.e., bitwise identical). As such, when a new file is to be stored, the data block signatures for the file content are first compared with signatures in a hash table. The hash table is a data structure that maps the signature of the file content to data blocks in storage media. If there is a match, then the file content is not copied, and instead a corresponding reference is created to the matching content already stored in the file system. This approach requires maintaining an index system (i.e., the hash table and the related software).

The above-noted index system is exclusive of the file system that is used to manage the files on the storage media and is thus separately implemented and maintained. For example, in a system that supports full-object deduplication, generally an elaborated data structure such as an extensible hash table, Btree or other complex data structure is used to implement the hash directory. Each system component has separate cluster management and scale-out capabilities resulting in redundancies and inefficiencies.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, systems and methods for optimizing deduplication in a data storage system are provided. The method comprises associating a first name with first data blocks including first content stored in a data storage system, wherein the first name is associated with the first data blocks by way of a reference to a first meta file that points to a data file which points to the first data blocks; storing a first signature derived from the first content in an indexing data structure, wherein the first signature is used to associate the first name with the first data blocks and as means to verify whether a second content is a duplicate of the first content, based on value of a second signature derived from the second content.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
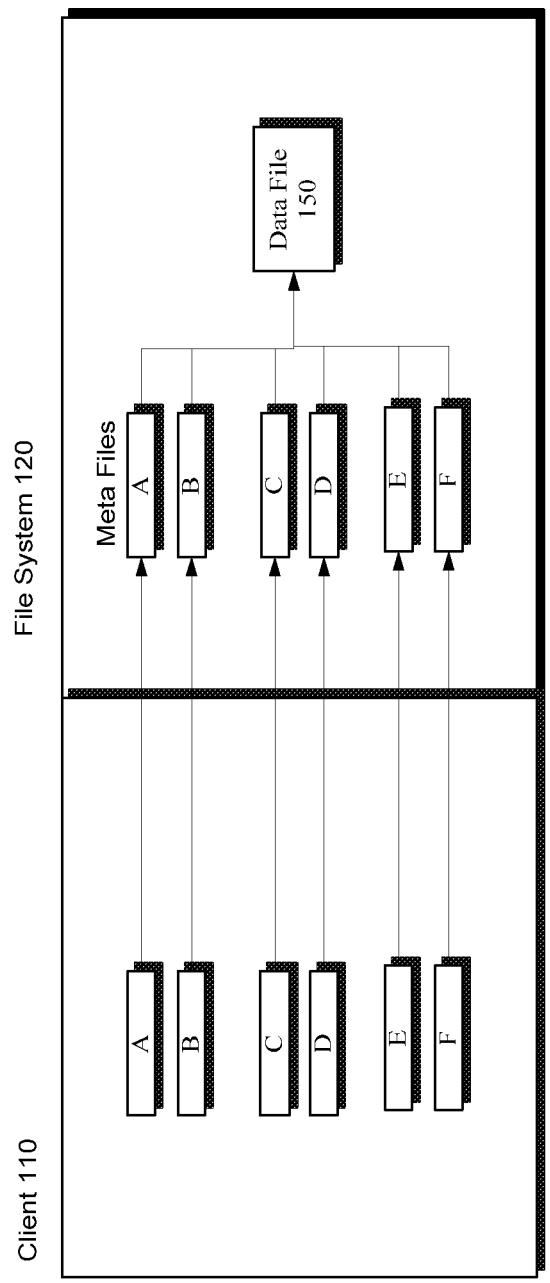
FIG. 1 illustrates an exemplary computing environment in accordance with one or more embodiments, wherein storage requests are serviced and deduplicated.

Referring to FIG. 1, an exemplary file system 120 is provided in which client 110 requests for data access and storage are serviced. In accordance with one embodiment, a full-object deduplication system is implemented over the file system 120 without the need to maintain a separate indexing system for hashing the signatures for the data blocks. Instead, a hash table is embedded within the file directory structure in the file system 120 to enable transparent data deduplication leveraging internal file system 120's capabilities, including caching, cluster management, and scaling features which are inherent in scalable file systems.

As shown in FIG. 1, in one implementation, each object or file is represented by a data file 150 and a meta file. Data file 150 includes the object's data content. Desirably, the path name to the object (e.g., the data file) is defined according to a signature which may be the hash of the object's content. The meta file includes the corresponding metadata (e.g., access control data) for the object but no content data. The meta file includes a pointer to the corresponding data file in the file system 120. For deduplication purposes, if multiple objects (e.g., A, B, . . . , F) are duplicates, then instead of having a separate data file 150 for each object, the meta files (e.g., meta files A, B, . . . , F) point to a single data file 150.

Figure 2:
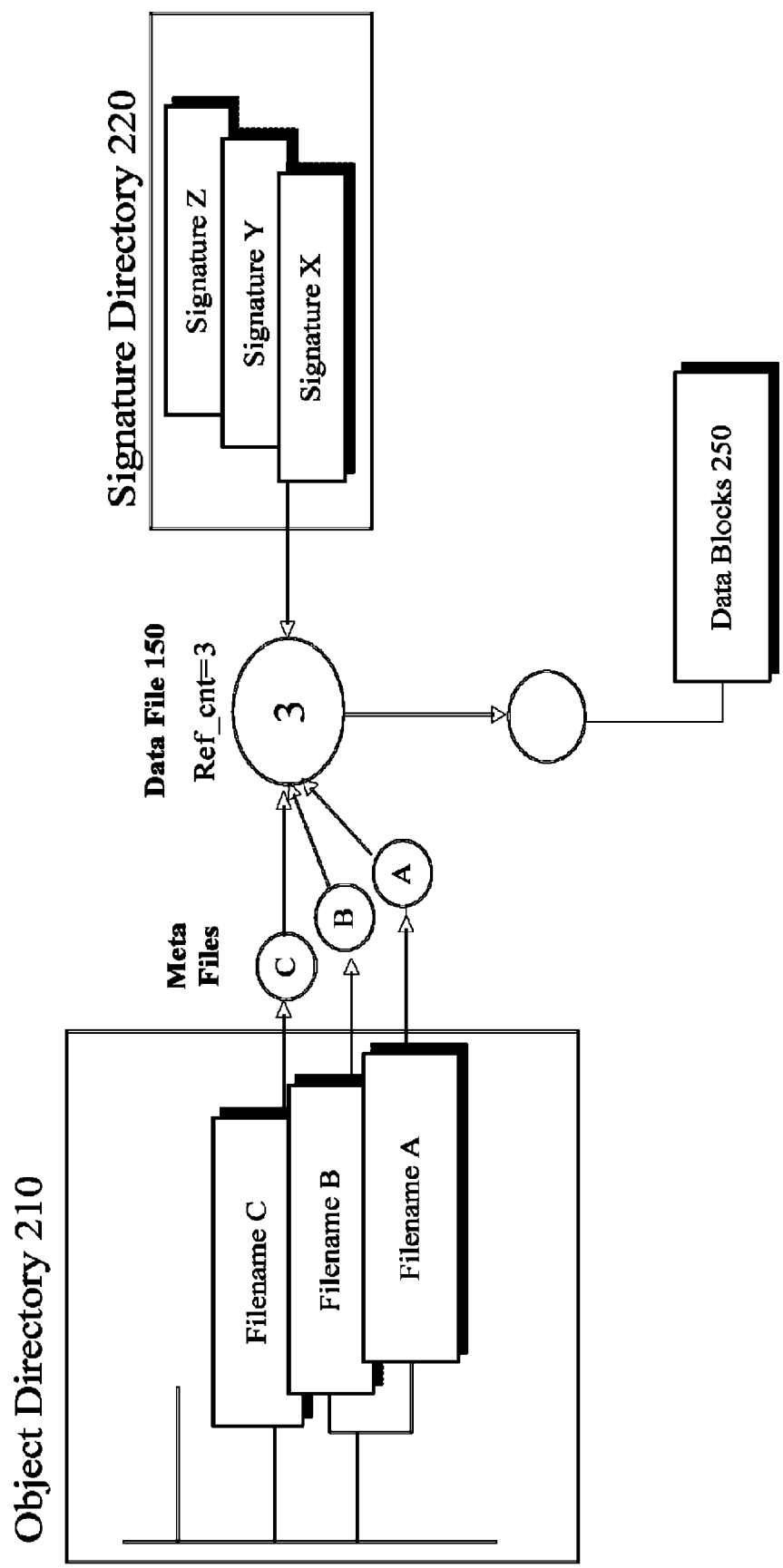
FIG. 2 is an exemplary block diagram of one implementation of an embodiment in which an object directory in association with a signature directory is utilized to deduplicate data in a storage system.

Referring to FIG. 2, in accordance with one embodiment, one or more files (e.g., with filenames A, B, C) may be included in an object directory 210 in the file system 120. The signatures (e.g., signatures A, B, C) associated with the content of each file may be maintained in a signature directory 220. As noted earlier, the signature directory 220 is desirably supported by the file system 120, so that a separate data indexing mechanism is not utilized to implement the same. The signature directory 220 includes the signatures for files in object directory 210.

Figure 3:
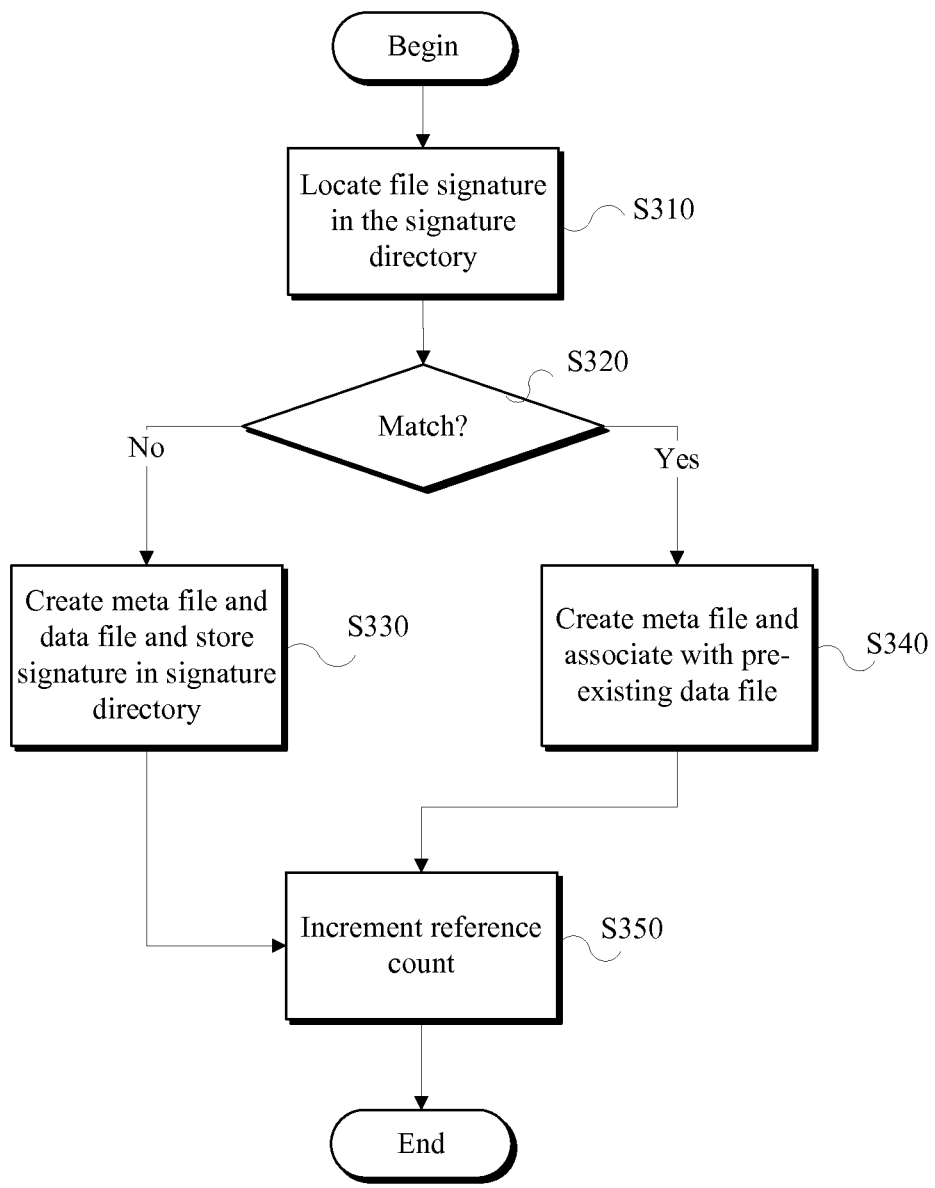
FIG. 3 is a flow diagram of an exemplary method for optimizing data deduplication, in accordance with one embodiment.

Referring to FIG. 3, when a new file is to be stored in the storage system, the file's signature is matched with the signatures in the signature directory 220 (S310, S320). If a match is not found, then the signature for the file content is stored in the signature directory 220 and two files (herein also referred to as iNodes) are created: a meta file (iNode1) and a data file (iNode2) (S330). Depending on implementation, an mode may be a data structure on a traditional Unix-style file system such as UFS or other viable alternative.

An inode may for example store the relevant information about a file's ownership, access mode (read, write, execute permissions), and file type, as well as directory related information, or other file system object. An inode may not include the file's content and filename, however, in some implementations. In one embodiment, the meta file provides an association between the filename in the object directory 210 and the data file 150 and the corresponding signatures in the signature directory 220 (see FIG. 2). The data file 150 may be thus be associated with the corresponding data blocks 250 on the data storage medium.

If when comparing the signature for a file to be written, a match is found in the signature directory 220, then a meta file (i.e., iNode1) for the file is created (P330), however an additional copy of the data file 150 (i.e., iNode2) is not created. Instead, the meta file provides an association between the file name and the data file 150 that matches the signature for the new filename For example, if filename A already exists in object directory 210 with a meta file A, when a new filename B with the same signature as filename A is written, a pointer is provided from filename B to data file 150. In this manner, the data blocks 250 are not duplicated in the storage medium.

In one embodiment, the data file may include a reference count (e.g., Ref_cnt). The reference count indicates the number of meta files (or filenames) that have the same signature X and are associated with the data blocks 250. In a case where the first instance of an object or a file is being added to the object directory 210, the count is incremented to one, for example (e.g., from an initial value of zero). Accordingly, the count is incremented as the number of duplicates for the objects or the files associated with the data file 150 increases (S350). In the example embodiment shown in FIG. 2, the count is three, reflecting that files A, B and C include duplicate content, which is deduplicated in data blocks 250.

When a file is removed from the object directory 210, the meta file for the file is also removed in addition to the associations and links between the filename, the meta file and the data file. Also, the reference count is decremented by 1, for example. It is noted that when the reference count reaches a threshold value (e.g., 0), the system may be implemented to automatically delete the data file and the data blocks to which the data file refers. Alternatively, a garbage collection-type process may run in the background in predetermined time intervals or based on other factors (e.g., level of available storage) to remove data files with, for example, a zero reference count and the related data blocks.

Depending on implementation, the association between meta files and a data file may be established by way of a symbolic link from the meta file to the data file. A symbolic link is a type of file that contains a reference to another file or directory in the form of an absolute or relative path, for example. In one embodiment, file cloning functions supported by the file system may be utilized to create multiple meta files that are associated with a data file. Another option is to place the link in the extended attributes of the meta file (or in its content) to point to the data file. In alternate embodiments, a reference may be added in the filename that points to the data file.

In some embodiments, if data is mutable, then a copy on write (CoW) CoW mechanism may be utilized to clone the meta files. Mutable data refers to data whose value changes over time. Copy on write refers to an optimization strategy supported in file systems in which a single copy of data is maintained even if multiple instances of it are created. Additional copies of the data are created when data associated with a single instance needs to be updated. Thus, using copy on write, when a data object in the object directory is modified, the corresponding meta file is unlinked from the data file and is linked to a new data file that points to the updated version of the data. As such, for the purpose of deduplication, CoW or other efficient cloning mechanisms supported by the file system may be utilized to store new or update content in the file system.

In one implementation, data file names are internal to the system, therefore the names may be chosen independently. In one embodiment, the data files are evenly distributed across the file directory structure by using the hash value of the content (e.g., a pseudo-random string) and translating the hash value to file path name by, for example, adding a '/' or other meaningful characters to the file names In this manner, a signature directory may be built in an optimum manner by using a search tree or a prefix tree, for example, instead of a comparatively flat index data structure which provides for a less efficient and an imbalanced search structure.

In an embodiment where the names of the signature files are similar in the first set of the strings and concatenated by using a "/", for example, a search tree that is evenly spread and relatively smaller in the number bytes (due to the concatenation) may be used. For example, one may take a 20 bytes string hash value, divide it into 5 segments, 4 bytes each, and use each segment as a directory name. This results in a directory structure of depth 5, for example.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
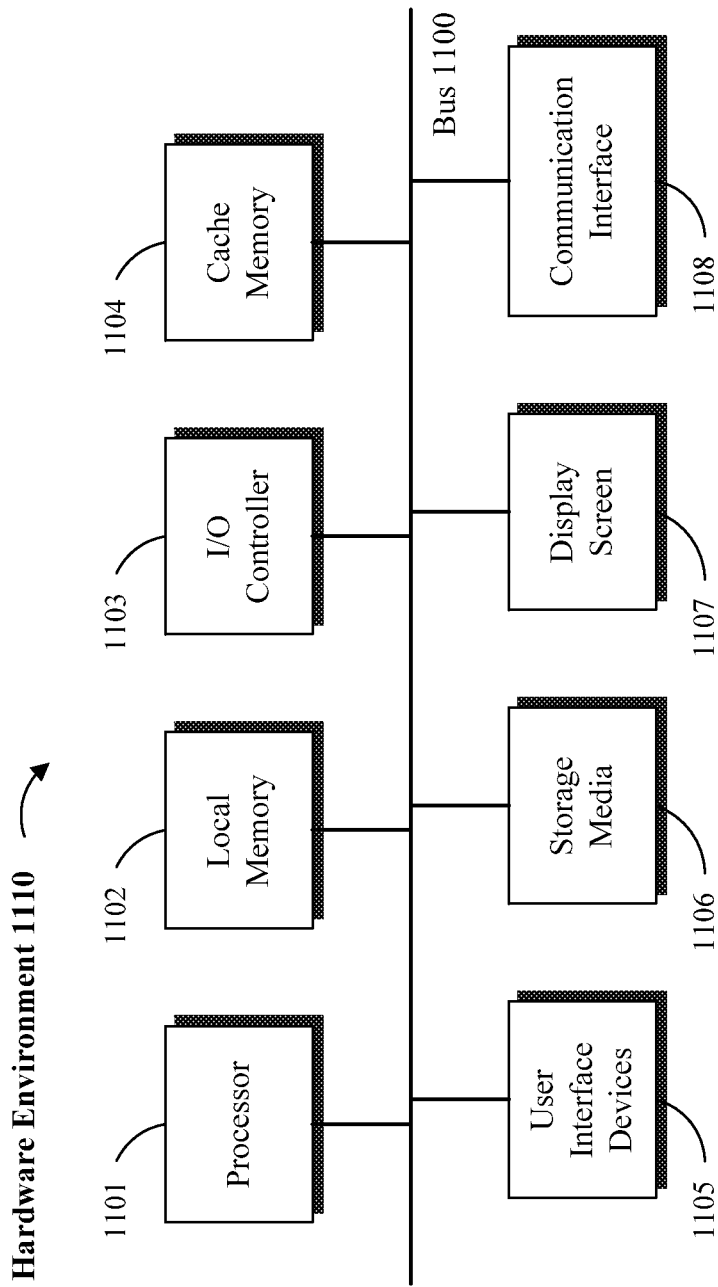
FIGS. 4A and 4B are block diagrams of hardware and software environments in which the disclosed systems and methods may operate, in accordance with one or more embodiments.
Figure 4B:
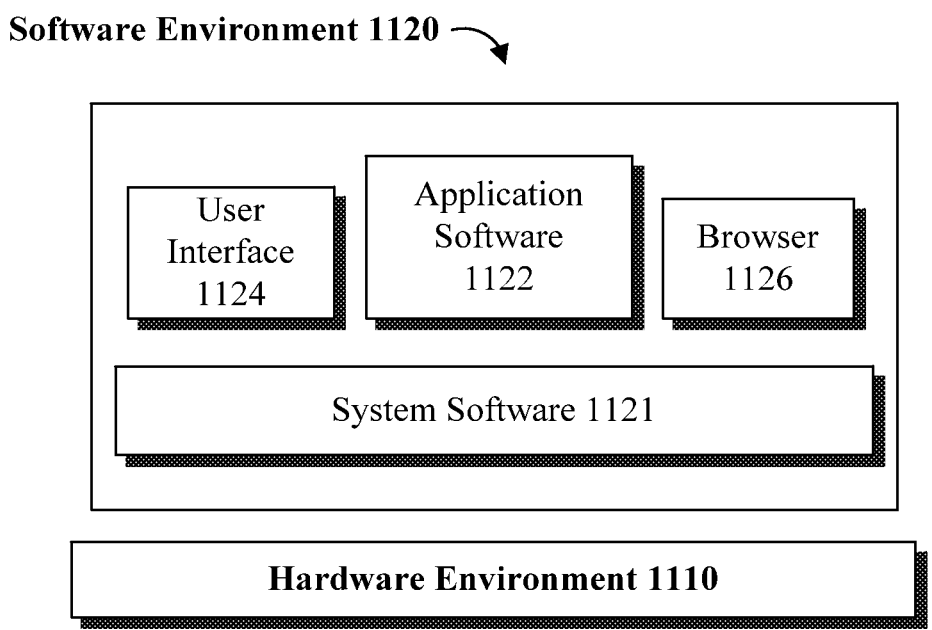

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for optimizing deduplication in a data storage system, the method comprising:
    associating a first file name with first data blocks including first content stored in a data storage system, wherein the first file name is associated with the first data blocks by way of a reference to a first meta file inode that points to a first data file inode which points to the first data blocks for a first data file in a file system,
  wherein there is a one to one relationship between a plurality of file names for a plurality of data files in the file system and respective meta files that point to a single data file, when the plurality of file names are duplicates of the same data file in the file system,
  wherein one or more meta files and data files are implemented as one or more inodes such that a meta file is represented by a meta file inode, and a data file is represented by a data file inode, wherein a plurality of meta file inodes point to a data file inode when the plurality of metafile inodes are associated with duplicate copies of the same content, wherein the same content is accessible via the data file inode to which the plurality of meta file inodes point;
storing a first signature derived from the first content in an indexing data structure, wherein the first signature is used to associate the first file name with the first data blocks and as means to verify whether a second content is a duplicate of the first content, based on value of a second signature derived from the second content; and
in response to determining that the second content is a duplicate of the first content, associating a second file name with the first data blocks that include the first content,
  wherein the second file name is associated with the first data block by way of a reference to a second meta file that points to the data file which points to the first data blocks.

2. The method of claim 1, wherein the first file name and the second file name are stored respectively in first and second entries in an object directory, wherein an entry in the object directory is used to access content associated with a name stored in that entry.

3. The method of claim 2, further comprising incrementing a counter associated with the data file, when an association is established between a file name in the object directory and the data file pointing to the first data blocks.

4. The method of claim 3, further comprising decrementing the counter associated with the data file, when an association between a file name in the object directory and the data file is removed.

5. The method of claim 4, further comprising removing the data file, when the counter associated with the data file indicates that no meta files are pointing to the data file.

6. The method of claim 4, further comprising removing the first data blocks from the data storage system, when the counter associated with the data file indicates that no meta files are pointing to the data file.

7. The method of claim 1, wherein the first signature is derived from the first content by applying a hash algorithm to the first content.

8. The method of claim 7, wherein the second signature is derived from the second content by applying a hash algorithm to the second content, such that if the first content and the second content are duplicates the first signature and the second signature match.

9. The method of claim 1, wherein one or more metafiles and data files are implemented in an inode data structure.

10. The method of claim 1, wherein in response to a request to update the content associated with the second file name, a copy of the first content is created by way of a copy on write process and the pointer from the second meta file is associated with the copy of the first content, and the copy of the first content is updated according to the request.

11. A system for optimizing deduplication in a data storage system, the system comprising:
  a processor;
  a logic unit for associating a first file name with first data blocks including first content stored in a data storage system,
    wherein the first file name is associated with the first data blocks by way of a reference to a first meta file that points to a first data file inode which points to the first data blocks for a first data file in a file system;
    wherein there is a one to one relationship between a plurality of file names for a plurality of data files in the file system and respective meta files that point to a single data file, when the plurality of file names are duplicates of the same data file in the file system;
    wherein one or more meta files and data files are implemented as one or more inodes such that a meta file is represented by a meta file inode, and a data file is represented by a data file inode, wherein a plurality of meta file inodes point to a data file inode when the plurality of metafile inodes are associated with duplicate copies of the same content, wherein the same content is accessible via the data file inode to which the plurality of meta file inodes point;
  a logic unit for storing a first signature derived from the first content in an indexing data structure, wherein the first signature is used to associate the first file name with the first data blocks and as means to verify whether a second content is a duplicate of the first content, based on value of a second signature derived from the second content; and
  a logic unit for associating a second file name with the first data blocks that include the first content, in response to determining that the second content is a duplicate of the first content,
    wherein the second file name is associated with the first data blocks by way of a reference to a second meta file that points to the data file which points to the first data blocks.

12. The system of claim 11, wherein the first file name and the second file name are stored respectively in first and second entries in an object directory, wherein an entry in the object directory is used to access content associated with a name stored in that entry.

13. The system of claim 12, wherein a counter associated with the data file is incremented, when an association is established between a file name in the object directory and the data file pointing to the first data blocks.

14. The system of claim 13, wherein the counter associated with the data file is decremented, when an association between a file name in the object directory and the data file is removed.

15. The system of claim 14, wherein the data file is removed, when the counter associated with the data file indicates that no meta files are pointing to the data file.

16. A computer program product comprising a non-transitory data storage medium having a computer readable program, wherein the computer readable program when executed on a computer causes the computer to:
  associate a first file name with first data blocks including first content stored in a data storage system, for a first data file in a file system,
    wherein there is a one to one relationship between a plurality of file names for a plurality of data files in the file system and respective meta files that point to a single data file, when the plurality of file names are duplicates of the same data file in the file system, wherein the first file name is associated with the first data blocks by way of a reference to a first meta file that points to a data file which points to the first data blocks;

wherein one or more meta files and data files are implemented as one or more inodes such that a meta file is represented by a meta file inode, and a data file is represented by a data file inode, wherein a plurality of meta file inodes point to a data file inode when the plurality of metafile inodes are associated with duplicate copies of the same content, wherein the same content is accessible via the data file inode to which the plurality of meta file inodes point;

store a first signature derived from the first content in an indexing data structure, wherein the first signature is used to associate the first file name with the first data blocks and as means to verify whether a second content is a duplicate of the first content, based on value of a second signature derived from the second content; and in response to determining that the second content is a duplicate of the first content, associating a second file name with the first data blocks that include the first content, wherein the second file name is associated with the first data blocks by way of a reference to a second meta file that points to the data file which points to the first data blocks.

17. The computer program product of claim 16, wherein the first file name and the second file name are stored respectively in first and second entries in an object directory, wherein an entry in the object directory is used to access content associated with a name stored in that entry.

18. The computer program product of claim 17, wherein a counter associated with the data file is incremented, when an association is established between a file name in the object directory and the data file pointing to the first data blocks.

19. The computer program product of claim 18, wherein the counter associated with the data file is decremented, when an association between a file name in the object directory and the data file is removed.

20. The computer program product of claim 19, wherein the data file is removed, when the counter associated with the data file indicates that no meta files are pointing to the data file.

* * * * *